United States Patent [19]
Braithwaite

[11] 4,222,761
[45] Sep. 16, 1980

[54] GLASSWARE FORMING MACHINES

[75] Inventor: David Braithwaite, Doncaster, England

[73] Assignee: Emhart Industries, Inc., Farmington, Conn.

[21] Appl. No.: 19,052

[22] Filed: Mar. 9, 1979

[30] Foreign Application Priority Data

Mar. 17, 1978 [GB] United Kingdom ............... 10663/78

[51] Int. Cl.² ............................................. C03B 11/00
[52] U.S. Cl. ....................................... 65/207; 65/305; 65/359
[58] Field of Search ................. 65/207, 226, 227, 229, 65/305, 359

[56] References Cited

U.S. PATENT DOCUMENTS 3,914,120 10/1975 Foster ..................................... 65/229

Primary Examiner—Richard V. Fisher
Attorney, Agent, or Firm—H. Samuel Kieser

[57] ABSTRACT

A preferred glassware forming machine has a neck ring carriage for transferring parisons from a blank station A, to a further station B. The carriage is guided for horizontal reciprocatory motion on two spaced, parallel guide rails and carries two relatively movable neck ring parts which engage the necks of the parisons during the transfer of the parisons from station A to station B. Relative movement of the neck ring parts is effected by piston and cylinder devices which are carried by the carriage and which are operated by compressed or suction fluid supplied to the carriage through one or both guide rails, the application of the compressed or suction fluid to one or both guide rails being in timed relationship with movement of the carriage.

6 Claims, 5 Drawing Figures

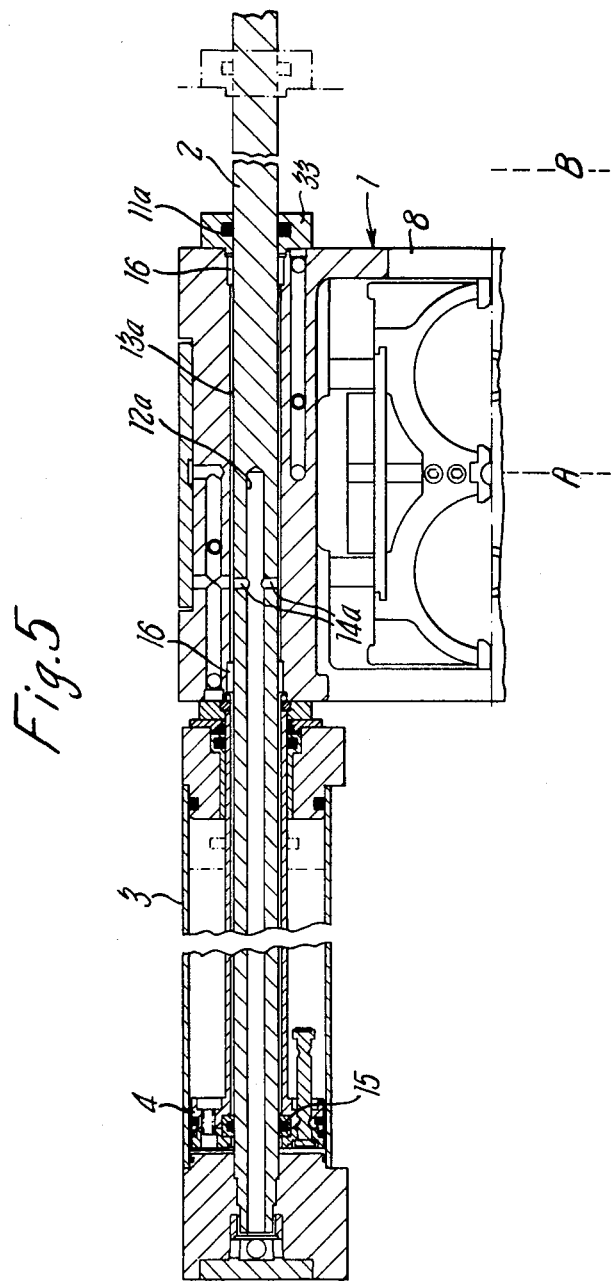

GLASSWARE FORMING MACHINES

BACKGROUND OF THE INVENTION

This invention relates to a glassware forming machine having a blank station at which parisons are formed in an upwardly open parison mould from gobs of molten glass, and a movable carriage which transfers the parisons from the blank station to a further station of the machine, the carriage having separable neck ring parts which undergo relative movement in timed relationship with the movement of the carriage.

In such a machine provision must be made for driving the carriage between the stations as well as controlling the relative positions of the neck ring parts along the path of movement of the carriage. One way of achieving this, disclosed in British Patent Specification No. 1,491,859 (corresponding to U.S. Pat. No. 3,914,120), is to use reciprocable fluid motors to drive the carriage along two spaced parallel guide rails which are fixed in the direction of movement of the carriage but which are rotated in the manner of spindles to control movement of the neck ring parts. Rotation of the two guide rails is transmitted to the two neck ring parts by means of two pinions which are respectively splined on the two guide rails and which mesh with racks, the racks being mounted on the carriage and being relatively movable in a direction perpendicular to the movement of the carriage in order to move the neck ring parts.

In the machine disclosed in the aforementioned prior British and U.S. Patent Specifications, problems have been encountered in maintaining simultaneous control over the closing force applied to the neck ring parts and over the movement of the carriage during transfer of parisons from the blank station.

SUMMARY OF THE INVENTION

The present invention aims to overcome this problem and provides a glassware forming machine having a plurality of stations one of which is a blank station at which parisons are formed from gobs of molten glass in an upwardly open parison mould, a carriage for moving the parisons from the blank station to a further station, and guide means for guiding the carriage for reciprocatory straight line motion between the blank station and the further station, the carriage having relatively movable neck ring parts for engaging the neck of a parison, the neck ring parts being relatively movable under the pressure or suction influence of fluid conducted to the carriage through the guide means, the neck ring parts being closed when the carriage is at the blank station to engage the finish of the parison and opened when the carriage is at the further station to release the parison.

By using the guide means to conduct the influence of the fluid to the carriage, better control can be maintained over the movement of the neck ring parts because the force applied to the neck ring parts is entirely independent of the force required to drive the carriage, in contrast to the machine of British Patent Specification No. 1,491,859 where the force necessary to drive the carriage is dependent on the force applied through the racks and pinions to the neck ring parts.

The guide means preferably comprise two spaced parallel guide rails along which the carriage slides, and in a preferred embodiment compressed fluid in one of the rails acts to close the neck ring parts and compressed fluid in the other of the rails acts to open the neck ring parts. In an alternative construction, only one of the guide rails is used to conduct the influence of the fluid to the carriage, pressure fluid being applied to said one guide rail to open (or close) the neck ring parts and suction being applied to close (or open) the neck ring parts.

In a further alternative construction, the guide means comprise only one guide rail. Regardless of the number of guide rails, the neck ring parts may be biased (e.g. by spring means) to the closed position and opened by the suction or pressure influence of the fluid.

The carriage preferably carries on its underside at least one pair of piston and cylinder devices, each piston being movable as a result of the influence of the fluid and being connected to a corresponding one of the neck ring parts, the pistons of the or each pair of devices being movable with respect to the carriage in an aligned directiion perpendicular to the direction of movement of the carriage. The pressure or suction influence in the or each guide rail may be communicated to ports in the carriage through the intermediary of an annular space the inner periphery of which is defined by the outer surface of the guide rail and the outer periphery of which is defined partially by the carriage and the remainder by tubular members slidable with the carriage along the guide rail, the ends of the annular space being defined by seals which engage the outer periphery of the guide rail and which are spaced apart by a distance greater than the amplitude of reciprocatory motion of the carriage.

BRIEF DESCRIPTION OF THE DRAWINGS

The movable carriage and guide means of a glassware forming machine according to the invention will now be described, by way of example, with reference to the accompanying drawings, in which:

FIG. 5 is a fragmentary sectional plan view, similar to part of FIG. 2, but showing a modified construction of the carriage and guide means.

DESCRIPTION OF THE PREFERRED EMBODIMENT

Figure 1:
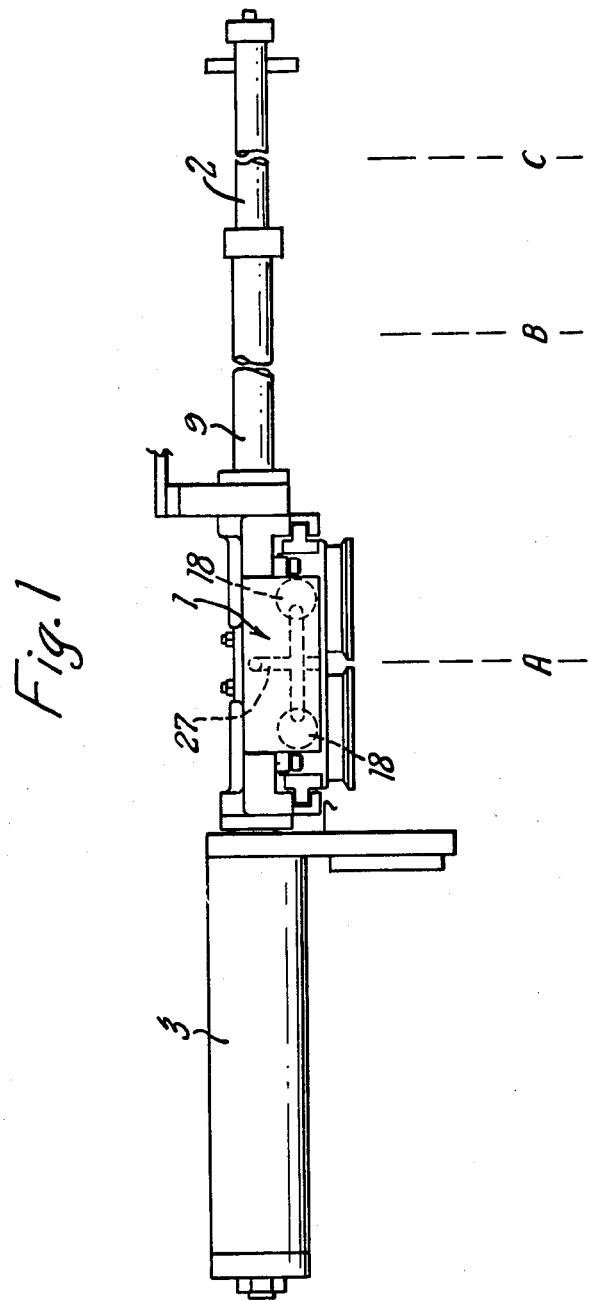
FIG. 1 is a side view of the carriage and guide means.

The glassware forming machine described with reference to the drawings is designed for double gob operation and has three operating stations (similar to that disclosed in British Patent Specification No. 1,491,859), namely a blank station at which parisons are formed in upwardly open parison moulds from gobs of molten glass, an intermediate station at which the parisons are further formed, and a blow station at which the parisons are finally shaped into articles of glassware. These three stations are respectively indicated at A, B and C in FIGS. 1 and 2, the carriage 1 reciprocating between the blank station A and the intermediate station B to transfer the parisons from the blank station A to the intermediate station B. The parisons are transferred from the intermediate station B to the blow station C by means of a first blow head and tong mechanism (not shown), a second blow head and tong mechanism (also not shown) being used to transfer the parisons from the blow station C to a deadplate of the machine. The parisons and finally shaped articles are moved horizontally from station to station in sequence in the manner described in British Patent Specification No. 1,491,859.

The carriage 1 is guided for horizontal reciprocatory motion between the blank station A and the intermediate station B by means of two horizontally extending guide rails 2 which span the stations A, B and C. The guide rails 2 are fixed and are horizontally spaced on respective sides of the section centre line X—X (FIG. 2). At its left-hand end as viewed in FIGS. 1 and 2, each guide rail 2 is secured to a corresponding fixed cylinder 3 within which an associated hollow piston 4 is slidable. Each piston 4 is connected to a corresponding hollow piston rod 5 which projects from the cylinder 3 and which locates in an annular recess 6 in the adjacent face 7 of the carriage 1, an annular seal being provided to seal the abutting surfaces of the carriage 1 and the piston rod 5. The opposite face 8 of the carriage 1 is engaged by one end of a sleeve 9 which surrounds the guide rail 2 and which carries the blow head and tong mechanism used to transfer the parisons from the intermediate station B to the blow station C. The carriage 1 has two parallel through bores 10 through which the guide rails 2 respectively extend.

Figure 2:
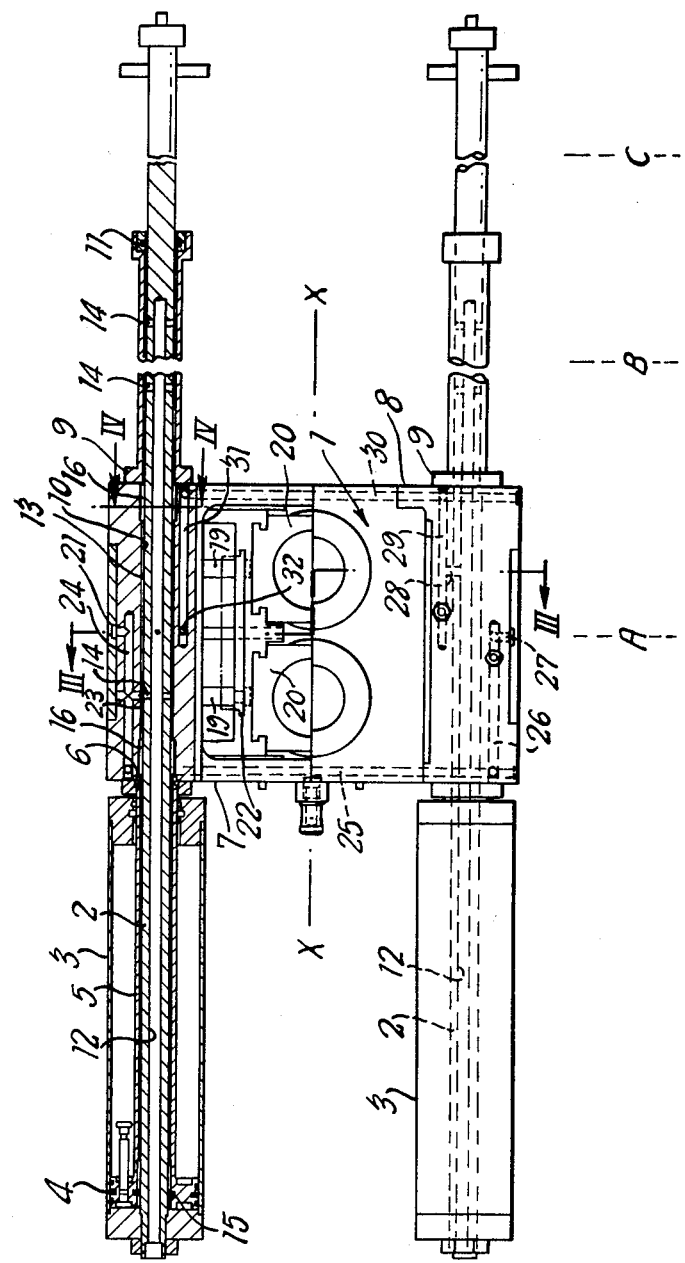
FIG. 2 is a plan view, partially in section, of the carriage and guide means.
Figure 4:
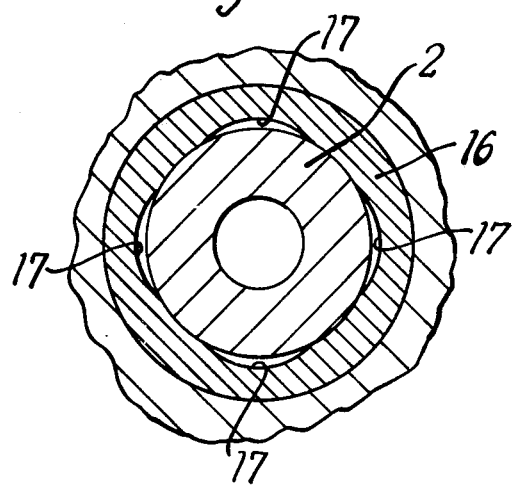
FIG. 4 is a fragmentary sectional view on the line IV—IV of FIG. 2.

Each guide rail 2 is hollow over the major part of its length by virtue of having an internal bore 12 extending from the left-hand end of the rail to a position just to the right of the intermediate station B, as viewed in FIGS. 1 and 2. At each of three spaced locations along the length of each guide rail 2, the bore 12 communicates with an annular space 13 surrounding the rail by means of four equi-angularly spaced radial bores 14 extending through the wall of the guide rail. The aggregate cross-sectional area of the four bores 14 at each location equals the cross-sectional area of each bore 12. The inner periphery of each annular space 13 is defined by the outer surface of the corresponding guide rail 2, and the outer periphery of the space 13 is defined by the associated piston rod 5, the bore 10 in the carriage 1 and the internal bore of the sleeve 9. It will be appreciated that the piston rod 5, the carriage 1 and the sleeve 9 each surround the corresponding guide rail 2 with radial clearance in order to define the associated annular space 13. The ends of each annular space 13 are defined by an annular seal 15 which is let into the piston 4 and engages the outer surface of the rail 2 and a further annular seal 11 which is let into the end of the sleeve 9 remote from the carriage and which also engages the outer periphery of the guide rail 2. Bearings 16 let into each end of each bore 10 of the carriage have four lobe-like recesses 17 (FIG. 4) cut therein to prevent the annular space being interrupted between the seals 15 and 11.

On its underside the carriage 1 carries two pairs of piston and cylinder devices 18, the devices of one pair being aligned and controlling movement of the opposed neck ring parts 20 which come together to contribute to the formation of one of the parison moulds at the blank station, and the devices of the other pair being similarly aligned and controlling movement of the neck ring parts which contribute to the formation of the other parison mould at the blank station. Movement of the piston rods 19 of the piston and cylinder devices 18 moves the neck ring parts 20 in a direction perpendicular to the centre line X—X and the direction of sliding movement of the carriage 1 along the guide rails 2. Each piston rod 19 is connected to the corresponding neck ring part 20 through the intermediary of a spacer plate 22 the thickness of which determines the width of opening of the neck ring parts 20. Spacer plates 22 of different thicknesses can be substituted to alter this width of opening.

Compressed air fed selectively to the bore 12 in one or other guide rail 12 passes into the corresponding annular space 13 and thence through passages in the carriage 1 to the piston and cylinder device 18. The bore 10 shown in the upper half of FIG. 2 and on the right-hand side of FIG. 3 has a port 23 communicating with a horizontal passage 24 one end of which leads, via a branching passage 21, to the outer ends of the two piston and cylinder devices 18 which are disposed above the centre line X—X in FIG. 2 and on the right-hand side of FIG. 3. The other end of the passage 24 leads to a transverse passage 25 extending horizontally across the centre line X—X, communicating with a passage 26 which in turn communicates with a branching passage 27 leading to the outer ends of the two piston and cylinder devices 18 which are disposed below the centre line X—X in FIG. 2 and on the left-hand side of FIG. 3. In a similar manner, the bore 10 disposed in the lower half of FIG. 2 and on the left-hand side of FIG. 3 has a port 28 communicating with passages 29, 30, 31 and 32 leading to the inner ends of the four piston and cylinder devices 18.

Figure 3:
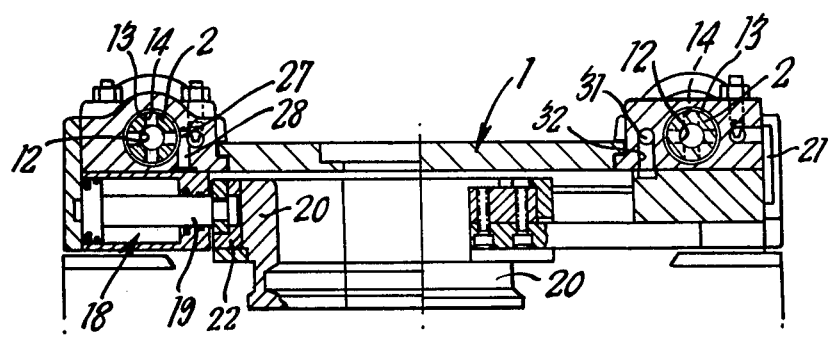
FIG. 3 is a sectional view on the line III—III of FIG. 2.

Hence, the neck ring parts 20 can be opened (or maintained in an open condition) by feeding pressure air to the bore 12 shown on the left-hand side of FIG. 3, and the neck ring parts 20 can be closed (or maintained in a closed condition) by feeding pressure air to the bore 12 shown on the right-hand side of FIG. 3.

In use, compressed air is fed selectively to the left-hand end of the bore 12 of one or other guide rail 2 in timed relationship with pressure fluid being fed to the cylinder 3, so that the opening and closing movement of the neck ring parts 20 occurs in timed relationship with reciprocating movement of the carriage 1 between the blank station A and the intermediate station B.

With the carriage 1 at the blank station A (as shown in FIGS. 1 and 2) compressed air is supplied to the bore 12 of the appropriate guide rail 2 to retain the neck ring part 20 in the closed position. After the conventional plungers have moved downwardly through the closed neck ring parts 20 to form the parisons from the gobs of molten glass in the parison moulds, the parison moulds open and compressed fluid is admitted to the cylinders 3 to move the carriage 1 (with the closed neck ring parts 20 engaging the finish of each parison) to the intermediate station B. During movement of the carriage from the station A to the station B, the neck ring parts are maintained in their closed position by the continuing air pressure fed to the right-hand rail 2 shown in FIG. 3. When the carriage reaches the intermediate station B, pressure air is diverted to the bore 12 of the other guide rail 2 (i.e. the left-hand guide rail 2 as viewed in FIG. 3) in order to open the neck ring parts 20 so that the parisons are deposited at the intermediate station B. The carriage 1 is then returned to the blank station A by fluid pressure applied to the cylinders 3, the neck ring parts 20 being closed during this traverse of the carriage ready for the formation of the next parisons at the blank station A.

In the modified construction shown in FIG. 5, each of the guide rails 2 has an internal bore (designated 12a) which terminates at the blank station A and which communicates with the corresponding annular space 13a by one set only of four radial bores 14a. Each annular space 13a does not extend beyond the face 8 of the carriage 1 but is terminated (at its right-hand end as viewed in FIG. 5) by an annular seal 11a left into a collar 33 which slides along the corresponding rail 2 with the carriage 1. The other end of each annular space 13a is defined by the seal 15 let into the piston 4, as in the embodiment of FIGS. 1 to 4. Whilst the annular spaces 13a are shorter than the spaces 13 of the embodiment of FIGS. 1 to 4, each space 13a is sufficiently long to ensure that the pressure or suction influence of fluid within the bore 12a is communicated to the passages in the carriage 1 throughout the amplitude of movement thereof between the stations A and B.

By using the guide rails to transport the pressure air, the neck ring parts can be maintained in the closed position during transfer to the parisons from the blank station to the intermediate station without adversely affecting the transfer motion of the carriage. In particular, the closing force applied by the neck ring parts to the parisons can be less than in the mechanical arrangement of racks and pinions disclosed in British Patent Specification No. 1,491,859. Pneumatic operation of the neck ring parts also enables the carriage to be moved faster.

An alternative embodiment (not illustrated in the drawings) uses only one guide rail to transmit pressure or suction air to the carriage to move the neck ring parts, pressure air being applied to the bore in the guide rail to close (or open) the neck ring parts and suction being applied to the bore in the guide rail to open (or close) the neck ring parts.

I claim:

1. A glassware forming machine having a plurality of stations one of which is a blank station at which parisons are formed from gobs of molten glass in an upwardly open parison mould, a carriage for moving the parisons from the blank station to a further station, and guide means for guiding the carriage for reciprocatory straight line motion between the blank station and the further station, the carriage having relatively movable neck ring parts for engaging the neck of a parison, means for relatively moving the neck ring parts under the pressure or suction influence of fluid connected to the carriage through the guide means, the neck ring parts being closed when the carriage is at the blank station to engage the finish of the parison and open when the carriage is at the further station to release the parison.

2. A glassware forming machine according to claim 1, wherein the guide means comprise two spaced parallel guide rails along which the carriage slides.

3. A glassware forming machine according to claim 2, wherein means providing compressed fluid in one of the rails acts to close the neck ring parts and means providing compressed fluid in the other of the rails acts to open the neck ring parts.

4. A glassware forming machine according to claim 2, wherein only one of the guide rails is used as means to conduct the influence of the fluid to the carriage, pressure fluid being applied to said one guide rail to open (or close) the neck ring parts and suction being applied to close (or open) the neck ring parts.

5. A glassware forming machine according to any one of the preceding claims, wherein the carriage carries on its underside at least one pair of piston and cylinder devices, each piston being movable as a result of the influence of the fluid and being connected to a corresponding one of the neck ring parts, the pistons of the or each pair of devices being movable with respect to the carriage in an aligned direction perpendicular to the direction of movement of the carriage.

6. A glassware forming machine according to claim 2, wherein the pressure or suction influence in the or each guide rail is communicated to ports in the carriage through the intermediary of an annular space the inner periphery of which is defined by the outer surface of the guide rail and the outer periphery of which is defined partially by the carriage and the remainder by tubular members slidable with the carriage along the guide rail, the ends of the annular space being defined by seals which engage the outer periphery of the guide rail and which are spaced apart by a distance greater than the amplitude of reciprocatory motion of the carriage.

* * * * *

UNITED STATES PATENT AND TRADEMARK OFFICE
CERTIFICATE OF CORRECTION

PATENT NO. : 4,222,761
DATED : September 16, 1980
INVENTOR(S) : David Braithwaite It is certified that error appears in the above—identified patent and that said Letters Patent is hereby corrected as shown below:

Col. 2, line 17 - "directiion" should read --direction--

Col. 4, line 6  - "12" should read --2--

Col. 5, line 3  - "left" should read --let--

Col. 6, line 1  - "connected" should read --conducted--

Signed and Sealed this

Twelfth Day of May 1981

[SEAL]

Attest:

RENE D. TEGTMEYER

Attesting Officer

Acting Commissioner of Patents and Trademark